(12) United States Patent
Noda et al.

(10) Patent No.: US 10,466,954 B2
(45) Date of Patent: Nov. 5, 2019

(54) DISPLAY CONTROL METHOD AND DISPLAY CONTROL DEVICE

(71) Applicant: FUJITSU LIMITED, Kawasaki-shi, Kanagawa (JP)

(72) Inventors: Kenzo Noda, Naruto (JP); Ryosuke Tomita, Tokushima (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 15/696,355

(22) Filed: Sep. 6, 2017

(65) Prior Publication Data

US 2018/0113668 A1 Apr. 26, 2018

(30) Foreign Application Priority Data

Oct. 20, 2016 (JP) .................................. 2016-206328

(51) Int. Cl.
*G09G 5/00* (2006.01)
*G06F 3/14* (2006.01)
*G06F 3/0482* (2013.01)

(52) U.S. Cl.
CPC .......... *G06F 3/1454* (2013.01); *G06F 3/1423* (2013.01); *G06F 3/0482* (2013.01); *G09G 2354/00* (2013.01); *G09G 2356/00* (2013.01); *G09G 2370/042* (2013.01)

(58) Field of Classification Search
CPC ................ G09G 5/14; G09G 2340/10; G09G 2340/125; G06T 11/60; G06T 15/503

USPC ........................................................ 345/629
See application file for complete search history.

(56) References Cited

U.S. PATENT DOCUMENTS

| | | | | |
|---|---|---|---|---|
| 6,493,008 B1 * | 12/2002 | Yui | .......................... | G09G 5/08 348/E5.104 |
| 8,606,949 B2 * | 12/2013 | Wogsberg | .............. | H04N 7/181 709/231 |
| 8,645,950 B2 * | 2/2014 | Fries | ................... | G06F 9/45533 718/1 |

FOREIGN PATENT DOCUMENTS

JP  2010-157005 A  7/2010

* cited by examiner

*Primary Examiner* — Gordon G Liu
(74) *Attorney, Agent, or Firm* — Westerman, Hattori, Daniels & Adrian, LLP

(57) ABSTRACT

Provided is a non-transitory computer-readable storage medium storing a display control program that causes a computer to execute a process, the process including: receiving a plurality of sets of image information displayed on a plurality of displays, a plurality of sets of identification information for identifying the plurality of displays, and setting information about a positional relation among the plurality of displays; and displaying image information included in the received plurality of sets of image information on a display of an own device, and displaying the received plurality of sets of identification information in the positional relation according to the received setting information.

17 Claims, 15 Drawing Sheets

FIG. 4

| TYPE | COMPUTER NAME | NETWORK TYPE | IPv4 ADDRESS | SUBNET MASK | MAC ADDRESS |
|---|---|---|---|---|---|
| PC001 | | WIRED LAN | 10.237.172.109 | 255.255.255.0 | 8C:73:6E:00:34:7A |
| | | WIRED LAN | 192.168.36.1 | 255.255.255.0 | 00:50:56:C0:00:01 |
| | | WIRED LAN | 192.168.72.1 | 255.255.255.0 | 00:50:56:C0:00:08 |
| PC002 | | WIRED LAN | 10.237.172.131 | 255.255.255.0 | 8C:73:6E:00:34:8B |
| | | WIRELESS LAN | 169.254.37.34 | | 40:25:C2:BE:31:60 |
| | | WIRELESS LAN | 169.254.182.94 | | 40:25:C2:BE:31:61 |
| | | WIRELESS LAN | 169.254.94.26 | | 40:25:C2:BE:31:62 |
| PC003 | | WIRED LAN | 10.237.172.108 | 255.255.255.0 | 8D:73:6F:00:34:7A |
| | | WIRED LAN | 192.168.36.2 | 255.255.255.0 | 01:50:56:C0:00:0B |
| | | WIRED LAN | 192.168.72.2 | 255.255.255.0 | 03:50:59:C0:00:04 |

DEVICE LIST SCREEN

DEVELOPMENT LINE TENANT

PERSON IN CHARGE: SYSTEM ADMINISTRATOR
SCREEN UPDATE DATE AND TIME: 2016/10/3 13:29

SEARCH RESULT — THREE ENTRIES — DISPLAY COLUMN PATTERN — NETWORK INFORMATION — RESOURCE OPERATION — DEVICE OPERATION — LIST OPERATION

| | TYPE | COMPUTER NAME | NETWORK TYPE | IPv4 ADDRESS | SUBNET MASK | MAC ADDRESS |
|---|---|---|---|---|---|---|
| ☐ | 🖥 | PC001 | WIRED LAN | 10.237.172.109 | 255.255.255.0 | 8C:73:6E:00:34:7A |
| | | | WIRED LAN | 192.168.36.1 | 255.255.255.0 | 00:50:56:C0:00:01 |
| | | | WIRED LAN | 192.168.72.1 | 255.255.255.0 | 00:50:56:C0:00:08 |
| | 🖥 | PC002 | WIRED LAN | 10.237.172.131 | 255.255.255.0 | 8C:73:6E:00:34:8B |
| | | | WIRELESS LAN | 169.254.37.34 | | 40:25:C2:BE:31:60 |
| | | | WIRELESS LAN | 169.254.182.94 | | 40:25:C2:BE:31:61 |
| | | | WIRELESS LAN | 169.254.94.26 | | 40:25:C2:BE:31:62 |
| | 🖥 | PC003 | WIRED LAN | 10.237.172.108 | 255.255.255.0 | 8D:73:6F:00:34:7A |
| | | | WIRED LAN | 192.168.36.2 | 255.255.255.0 | 01:50:56:C0:00:0B |
| | | | WIRED LAN | 192.168.72.2 | 255.255.255.0 | 03:50:59:C0:00:04 |

DEVICE LIST SCREEN
DEVELOPMENT LINE TENANT
PERSON IN CHARGE: SYSTEM ADMINISTRATOR
SCREEN UPDATE DATE AND TIME: 2016/10/3 13:29

SEARCH RESULT | THREE ENTRIES | DISPLAY COLUMN PATTERN | NETWORK INFORMATION ⌄ | RESOURCE OPERATION ⌄ | DEVICE OPERATION ⌄ | LIST OPERATION ⌄

10 Pt

X3 X2 X1

DISPLAY CONTROL METHOD AND DISPLAY CONTROL DEVICE

CROSS-REFERENCE TO RELATED APPLICATION

This application is based upon and claims the benefit of priority of the prior Japanese Patent Application No. 2016-206328 filed on Oct. 20, 2016, the entire contents of which are incorporated herein by reference.

FIELD

A certain aspect of the embodiments is related to a non-transitory computer-readable storage medium, a display control method, and a display control device.

BACKGROUND

There has been known a server device having a plurality of displays coupled thereto. There has also been known a client device that shares a screen with a server device coupled to the client device via a network as disclosed in, for example, Japanese Patent Application Publication No. 2010-157005.

SUMMARY

According to an aspect of the embodiments, there is provided a non-transitory computer-readable storage medium storing a display control program that causes a computer to execute a process, the process including: receiving a plurality of sets of image information displayed on a plurality of displays, a plurality of sets of identification information for identifying the plurality of displays, and setting information about a positional relation among the plurality of displays; and displaying image information included in the received plurality of sets of image information on a display of an own device, and displaying the received plurality of sets of identification information in the positional relation according to the received setting information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates a device list screen in accordance with a first embodiment;

FIG. 12 illustrates the device list screen in accordance with a second embodiment;

DESCRIPTION OF EMBODIMENTS

A user using a client device having a single display coupled thereto and a user using a server device having a plurality of displays coupled thereto may discuss the contents of images over, for example, a phone while watching the images displayed on their individual displays. In this case, assume that the image is shared with the client device and the server, but the user of the client device is watching the shared image while the user of the server is watching an image different from the shared image. Under this circumstance, if the users have a discussion about the images, the discussion may fail to move ahead smoothly because the images the users are discussing are different.

Hereinafter, embodiments for carrying out the present case will be described with reference to the accompanying drawings.

First Embodiment

Figure 1:
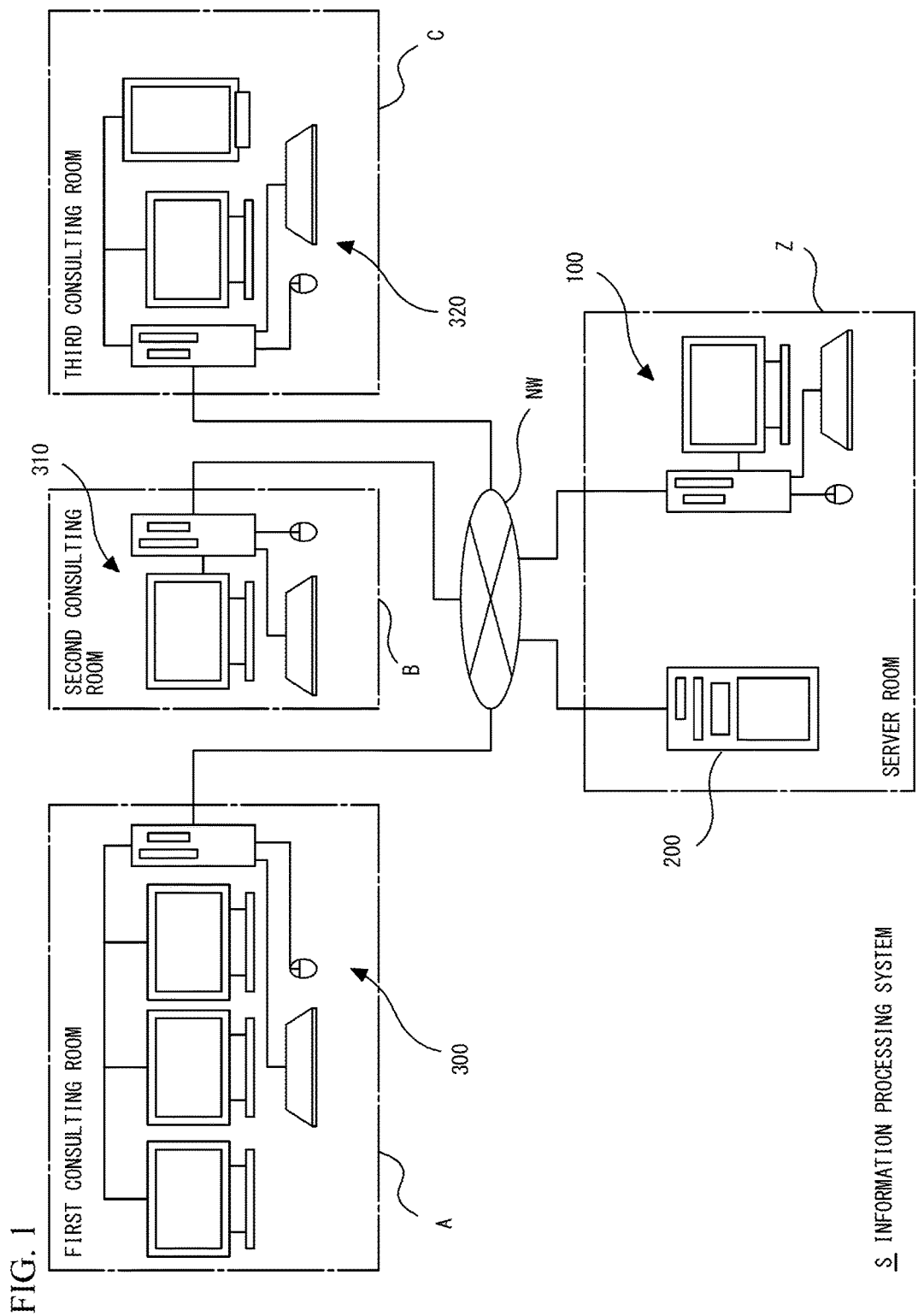
FIG. 1 is a diagram for describing an exemplary information processing system.

FIG. 1 is a diagram for describing an exemplary information processing system S. The information processing system S includes a remote connection terminal 100 as a display control device, a server device 200, and a plurality of connected terminals 300, 310, and 320. The remote connection terminal 100, the server device 200, and the connected terminals 300, 310, and 320 are interconnected through a communication network NW. Examples of the communication network NW include a wired or wireless local area network (LAN). In FIG. 1, personal computers (PCs) are illustrated as examples of the remote connection terminal 100 and the connected terminals 300, 310, and 320. However, the remote connection terminal 100 and the connected terminals 300, 310, and 320 are not limited to PCs, and may be smart devices having wireless communication functions such as tablet terminals.

The remote connection terminal 100 and the server device 200 are installed in, for example, a server room Z of a medical institution. On the other hand, the connected terminals 300, 310, and 320 are respectively installed in, for example, a first consulting room A, a second consulting room B, and a third consulting room C of the medical institution. The connected terminals 300, 310, and 320 are operated as electronic health record terminals by healthcare professionals such as doctors and nurses. The connected terminals 300, 310, and 320 access the server device 200 based on operations made by the healthcare professionals, obtain information necessary for medical care from the server device 200, and then display the obtained information. That is, the server device 200 serves the function of an electronic health record server.

In addition, the server device 200 stores device information for managing the connected terminals 300, 310, and 320 installed in the medical institution. That is, the server device 200 also serves the function of a database (DB) server. Although the details will be described later, the server device 200 also serves the function of a Domain Name System (DNS) server. The function of the electronic health record server, the function of the DB server, and the function of the DNS server may be assigned to separate server devices 200. The above device information includes a terminal ID or a computer name for identifying each of the connected terminals 300, 310, and 320, an Internet Protocol (IP) address and a Media Access Control (MAC) address assigned to each of the connected terminals 300, 310, and 320, and a network type for identifying the connection configuration of each of the connected terminals 300, 310, and 320 from a wired LAN and a wireless LAN.

The remote connection terminal 100 is used by an administrator who manages the device information. For example, based on operations made by the administrator, the remote connection terminal 100 connects to the connected terminal 300, and obtains image information of a screen that the connected terminal 300 displays as an image (hereinafter, referred to as a remote screen) and setting information about the setting of the remote screen. The setting information includes, for example, the positional relation among screens, the direction of the screen, the size of the screen the resolution), and a color depth. Especially when the connected terminal 300 includes a plurality of displays (when the connected terminal 300 is of a so-called multidisplay type), the remote connection terminal 100 obtains identification information for identifying a plurality of displays together with the screen information and the setting information. When obtaining the screen information and the setting information, the remote connection terminal 100 superimposingly displays the remote screen according to the obtained screen information and the obtained setting information on a screen that the remote connection terminal 100 displays (hereinafter, referred to as an own screen). When obtaining also the identification information, the remote connection terminal 100 superimposingly displays the obtained identification information on the remote screen in the positional relation according to the setting information. This configuration enables the administrator operating the remote connection terminal 100 to identify a plurality of displays that the connected terminal 300 has.

Figure 2:
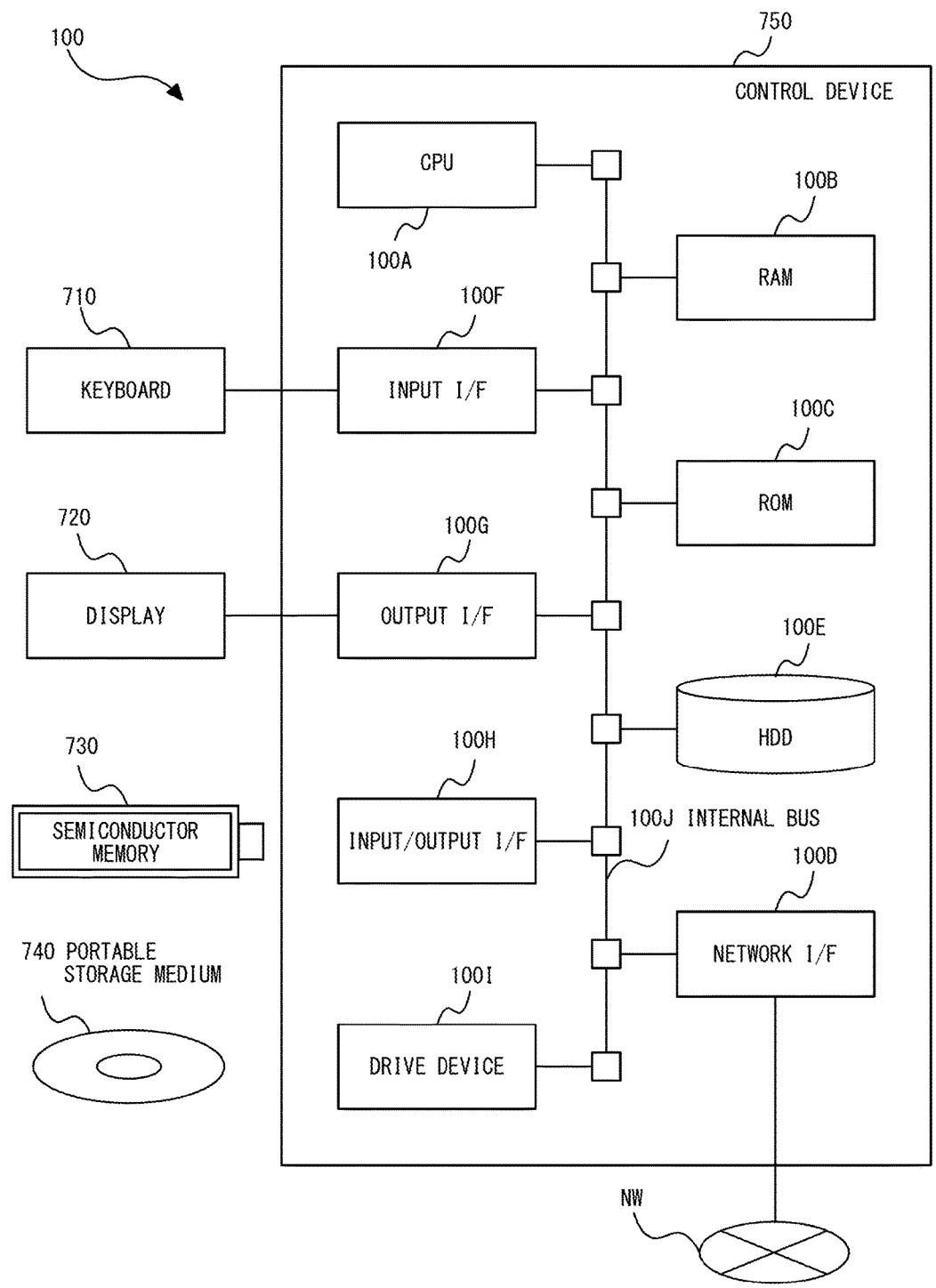
FIG. 2 illustrates a hardware configuration of a control device in a remote connection terminal.

Hereinafter, the details of the information processing system S will be described with reference to the accompanying drawings. FIG. 2 illustrates a hardware configuration of a control device 750 in the remote connection terminal 100. The server device 200 and the connected terminals 300, 310, and 320 basically have the same configuration as the control device 750, and the description thereof is thus omitted.

The control device 750 includes at least a central processing unit (CPU) 100A, a random access memory (RAM) 100B, a read only memory (ROM) 100C, and a network interface (I/F) 100D. The control device 750 may include at least one of a hard disk drive (HDD) 100E, an input I/F 100F, an output I/F 100G, an input/output I/F 100H, and a drive device 100I as necessary. The CPU 100A through the drive device 100I are interconnected through an internal bus 100J. The cooperation of at least the CPU 100A and the RAM 100B achieves a computer.

A keyboard 710 is coupled to the input I/F 100F. An input device such as a mouse may be coupled to the input I/F 100F together with the keyboard 710. A display 720 is coupled to the output I/F 100G. Examples of the display 720 include, but are not limited to, a liquid crystal display. A semiconductor memory 730 is coupled to the input/output I/F 100H. Examples of the semiconductor memory 730 include, but are not limited to, a USB memory and a flash memory. The input/output I/F 100H reads programs and data stored in the semiconductor memory 730. The input I/F 100F and the input/output I/F 100H include, for example, USB ports. The output I/F 100G includes, for example, a display port.

A portable storage medium 740 is inserted into the drive device 100I. Examples of the portable storage medium 740 include, but are not limited to, removal discs such as compact disc (CD)-ROMs and digital versatile discs (DVDs). The drive device 100I reads programs and data stored in the portable storage medium 740. The network I/F 100D includes, for example, a port and a physical layer chip (PHY chip). The remote connection terminal 100 is coupled to the communication network NW through the network I/F 100D.

The CPU 100A stores the programs stored in the ROM 100C or the HDD 100E in the above RAM 100B. The CPU 100A stores the programs stored in the portable storage medium 740 in the RAM 100B. The execution of the stored programs by the CPU 100A allows the control device 750 to achieve various functions described later and execute various processes described later. The programs are according to the flowcharts described later.

Figure 3:
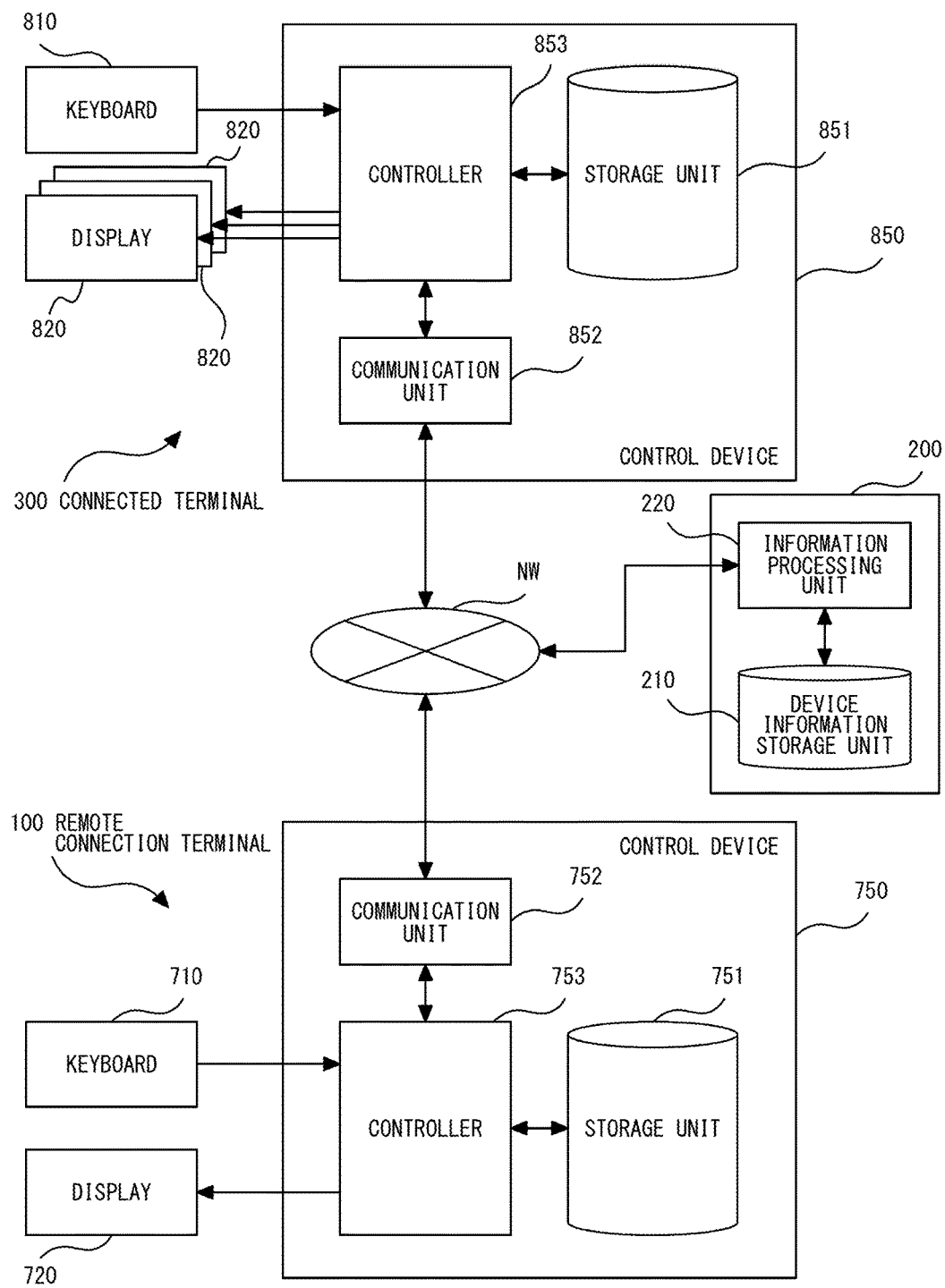
FIG. 3 is a functional block diagram of the remote connection terminal, a server device, and a connected terminal.

FIG. 3 is an exemplary functional block diagram of the remote connection terminal 100, the server device 200, and the connected terminal 300. In FIG. 3, the illustration of the connected terminals 310 and 320 is omitted, but the connected terminals 310 and 320 basically have the same functions as the connected terminal 300. Thus, the description thereof is omitted.

A description will first be given of the remote connection terminal 100. The remote connection terminal 100 includes, as illustrated in FIG. 3, the keyboard 710, the display 720, and the control device 750. The control device 750 includes a storage unit 751, a communication unit 752, and a controller 753 as a processor. The storage unit 751 is implemented by, for example, the above HDD 100E. The communication unit 752 is implemented by, for example, the above network I/F 100D. The controller 753 is implemented by, for example, the CPU 100A and the RAM 100B described above.

The storage unit 751 stores the screen information of the own screen and the above programs. For example, when the control device 750 starts, the controller 753 obtains the screen information stored in the storage unit 751, and displays the own screen according to the obtained screen information on the display 720. For example, when executing a program, the controller 753 achieves the function according to the program.

The communication unit 752 controls the communication of the remote connection terminal 100 with the server device 200 and the connected terminal 300. For example, the communication unit 752 receives various information (for example, the screen information and the like) transmitted from the server device 200 or the connected terminal 300. For example, the communication unit 752 transmits information that requests a predetermined screen including a list of the device information (hereinafter, referred to as a device list screen) to the server device 200, and transmits information that requests the screen information that the connected terminal 300 has.

The controller 753 controls the overall operation of the remote connection terminal 100. For example, when receiving an instruction input from the keyboard 710, the controller 753 changes the displayed contents of the display 720 according to the contents of the input instruction or causes the communication unit 752 to transmit various information. For example, when the communication unit 752 receives information transmitted from the server device 200, the controller 753 changes the displayed contents of the display 720 according to the received information or stores the information in the storage unit 751. Additionally, the controller 753 executes various processes described later.

A description will next be given of the server device 200. The server device 200 includes, as illustrated in FIG. 3, a device information storage unit 210 and an information processing unit 220. The device information storage unit 210 is implemented by, for example, the above HDD 100E. The information processing unit 220 is implemented by, for example, the CPU 100A, the RAM 100B, and the network I/F 100D described above.

The device information storage unit 210 stores the device information for an object of management. The device information includes, for example, a subnet mask and the address of the gateway coupled to the connected terminal 300 as constituent elements in addition to the terminal ID or computer name, the IP address and the MAC address, and the network type described above. The connected terminals 300, 310, and 320 installed in the medical institution are managed with the device information.

The information processing unit 220 executes various information processing. For example, when receiving information that requests the device list screen from the remote connection terminal 100, the information processing unit 220 obtains the device information from the device information storage unit 210. The information processing unit 220 then transmits the screen information including the list of the obtained device information to the remote connection terminal 100. Thus, when receiving the screen information, the remote connection terminal 100 displays the device list screen based on the received screen information.

A description will next be given of the connected terminal 300. The connected terminal 300 includes, as illustrated in FIG. 3, a keyboard 810, a plurality of displays 820, and a control device 850. The control device 850 includes a storage unit 851, a communication unit 852, and a controller 853. The storage unit 851 is implemented by, for example, the above HDD 100E. The communication unit 852 is implemented by, for example, the above network I/F 100D. The controller 853 is implemented by, for example, the CPU 100A and the RAM 100B described above.

The storage unit 851 stores a plurality of sets of the screen information about a remote screen displayed on each of the displays 820, the setting information about the setting of each remote screen, and a plurality of sets of the identification information for identifying the displays 820. For example, when the control device 850 starts, the controller 853 obtains the setting information and the screen information stored in the storage unit 851, and causes at least one of the displays 820 to display the remote screen according to the obtained setting information and the obtained screen information. The plurality of sets of the screen information are generated by the controller 753, and stored in the storage unit 851.

The communication unit 852 controls the communication of the connected terminal 300 with the remote connection terminal 100 and the server device 200. For example, the communication unit 852 receives various information (for example, a connection request, the screen information, or the like) requested from the remote connection terminal 100. For example, the communication unit 852 transmits the screen information, the setting information, and the identification information described above.

The controller 853 controls the overall operation of the connected terminal 300. For example, when the communication unit 852 receives a connection request from the remote connection terminal 100, the controller 853 causes the communication unit 852 to transmit the response to the connection request to the remote connection terminal 100. For example, when the communication unit 852 receives information that requests the screen information from the remote connection terminal 100, the controller 853 extracts the screen information, the setting information, and the identification information from the storage unit 851. After extracting the screen information, the setting information, and the identification information, the controller 853 causes the communication unit 852 to generate information that correlates the screen information, the setting information, and the identification information, and transmit the generated information to the remote connection terminal 100. Additionally, the controller 853 executes various processes.

Figure 5:
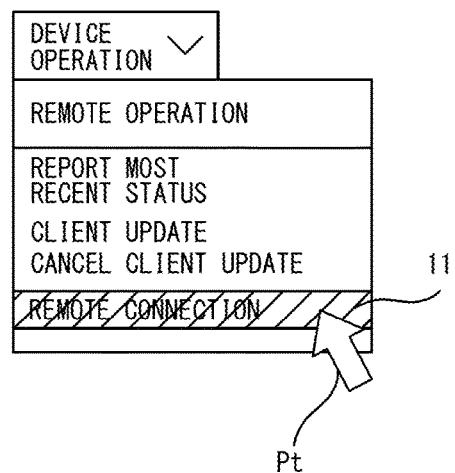
FIG. 5 illustrates a state where a device operation is expanded.
Figure 6:
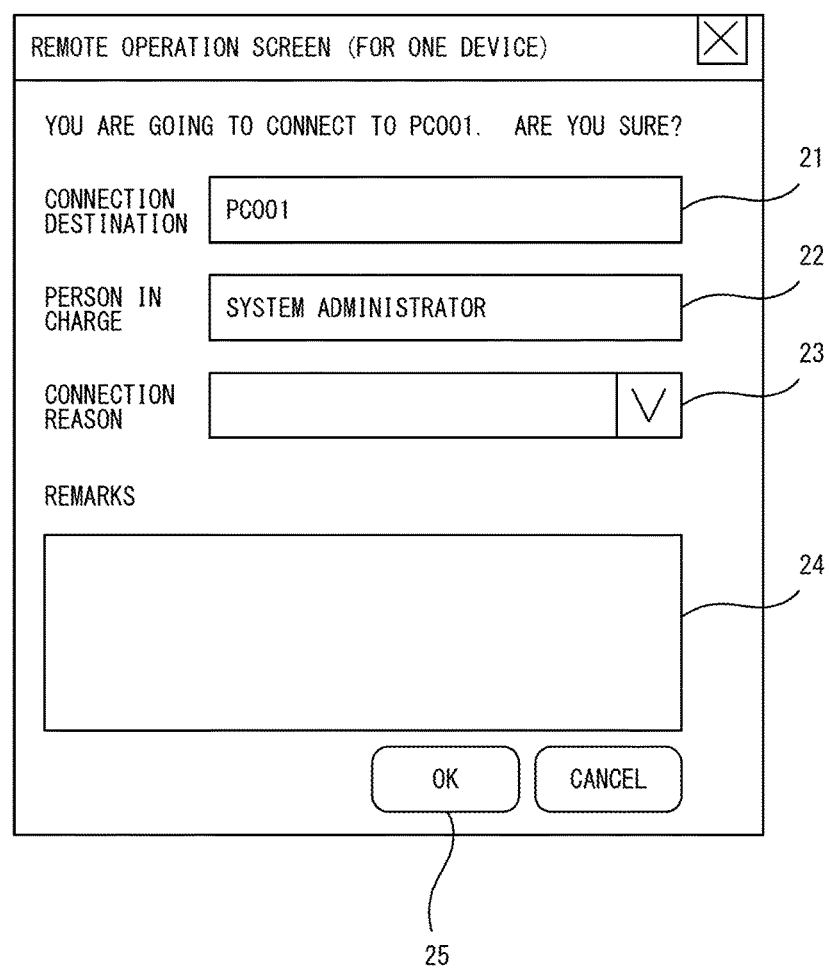
FIG. 6 illustrates a remote operation screen in accordance with the first embodiment.

With reference to FIG. 4 through FIG. 6, a description will be given of operations of the remote connection terminal 100 and the server device 200.

FIG. 4 illustrates the device list screen in accordance with the first embodiment. FIG. 5 illustrates a state where a device operation is expanded. FIG. 6 illustrates a remote operation screen in accordance with the first embodiment. When the controller 753 of the remote connection terminal 100 receives an instruction to request the device list screen from the keyboard 710, the controller 753 generates information that requests the device list screen. When the controller 753 generates the information that requests the device list screen, the communication unit 752 transmits the generated information to the server device 200.

When receiving the information that requests the device list screen, the information processing unit 220 of the server device 200 transmits the screen information of the device list screen to the remote connection terminal 100. This process causes the remote connection terminal 100 to display the device list screen as illustrated in FIG. 4. On the device list screen, displayed are at least one of items of the device information stored in the device information storage unit 210. For example, in the columns of the computer name, displayed are the names of the connected terminals 300, 310, and 320. For example, in the columns of the IPv4 address, displayed are the IP addresses assigned to the connected terminals 300, 310, and 320. This process enables the administrator to check various information about the connected terminals 300, 310, and 320 managed by the server device 200.

When receiving an instruction to request the remote operation screen from the keyboard 710, the controller 753 generates information that requests the remote operation screen. More specifically, as illustrated in FIG. 4, when one specific item X1 (e.g., a check box) on the device list screen is specified by a pointer Pt, and then a specific image 10 (for example, a device operating button) is operated, the controller 753 receives the operation, expands the image 10, and displays a plurality of selection items on the display 720 as illustrated in FIG. 5. Furthermore, as illustrated in FIG. 5, when a specific selection item 11 is operated by the pointer Pt, the controller 753 receives the operation and generates information that requests the remote operation screen for one device. When the controller 753 generates the information that requests the remote operation screen for one device, the communication unit 752 transmits the information to the server device 200. Although the details will be described in a second embodiment, when specific items X1, X2, and X3 are specified, the controller 753 generates information that requests a remote operation screen for multiple devices.

When receiving the information that requests the remote operation screen for one device, the information processing unit 220 of the server device 200 transmits the screen information of the remote operation screen for one device to the remote connection terminal 100. This process causes the remote connection terminal 100 to display the remote operation screen for one device as illustrated in FIG. 6. On the remote operation screen, displayed are an entry field 21 for inputting a connection method to a connection destination, an entry field 22 for inputting a person in charge who conducts a remote operation, a selection field 23 for selecting a connection reason, and an entry field 24 for inputting remarks. Through the remote operation screen, the administrator can identify, the connected terminal 300, 310, or 320 that is subject to a remote connection. Although the details will be described later, the computer name of the connected terminal 300, 310, or 320 or the IP address of the connected terminal 300, 310, or 320 may be input to the entry field 21 as the connection method.

A description will next be given of operations of the remote connection terminal 100 and the connected terminal 300 with reference to FIG. 7 through FIG. 11. The connected terminals 310 and 320 basically execute the same processes as the connected terminal 300, and the description thereof is thus omitted.

Figure 7:
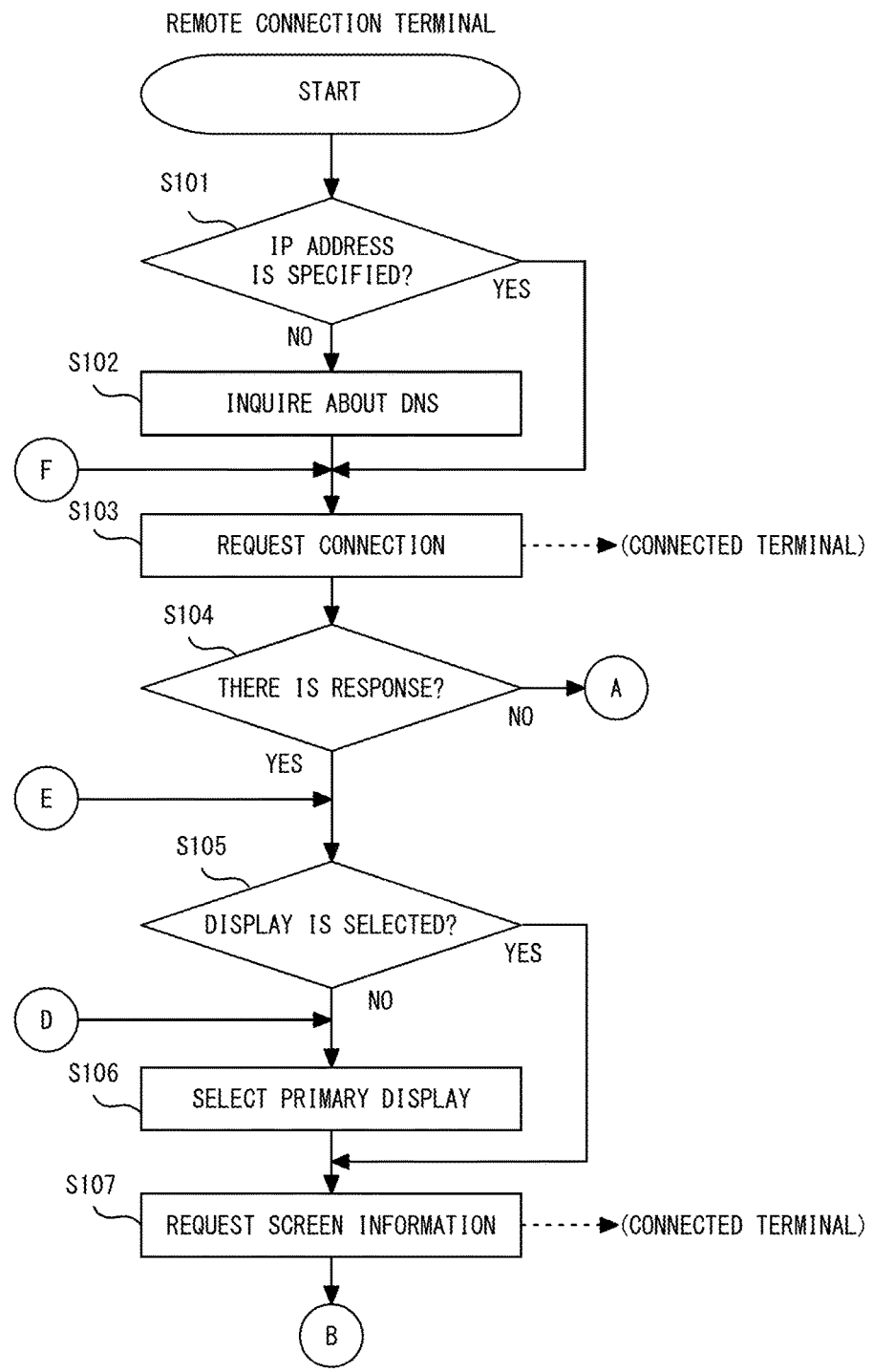
FIG. 7 is a flowchart (No. 1) of an exemplary operation of the remote connection terminal.
Figure 8:
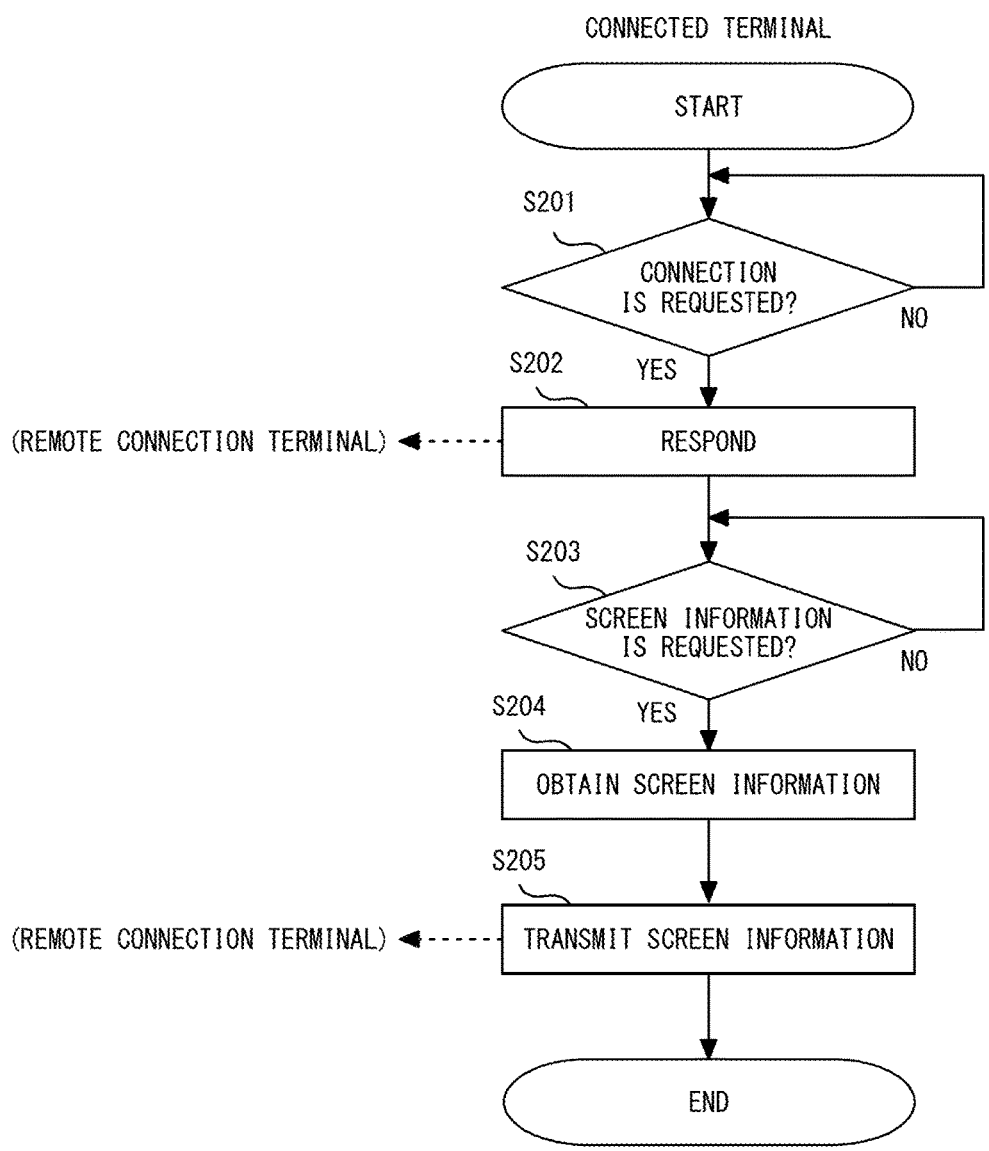
FIG. 8 is a flowchart of an exemplary operation of the connected terminal.
Figure 9:
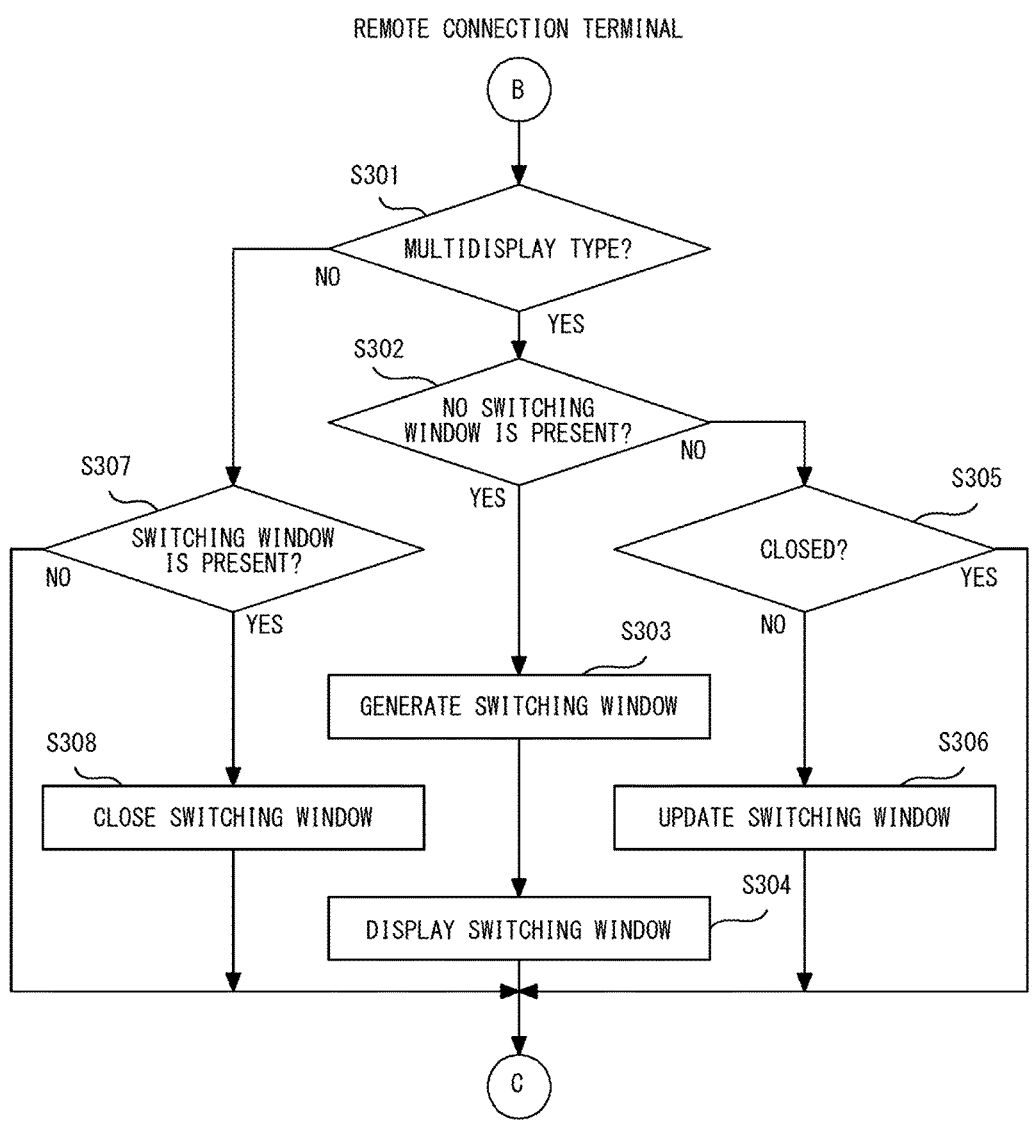
FIG. 9 is a flowchart (No. 2) of the exemplary operation of the remote connection terminal.
Figure 10:
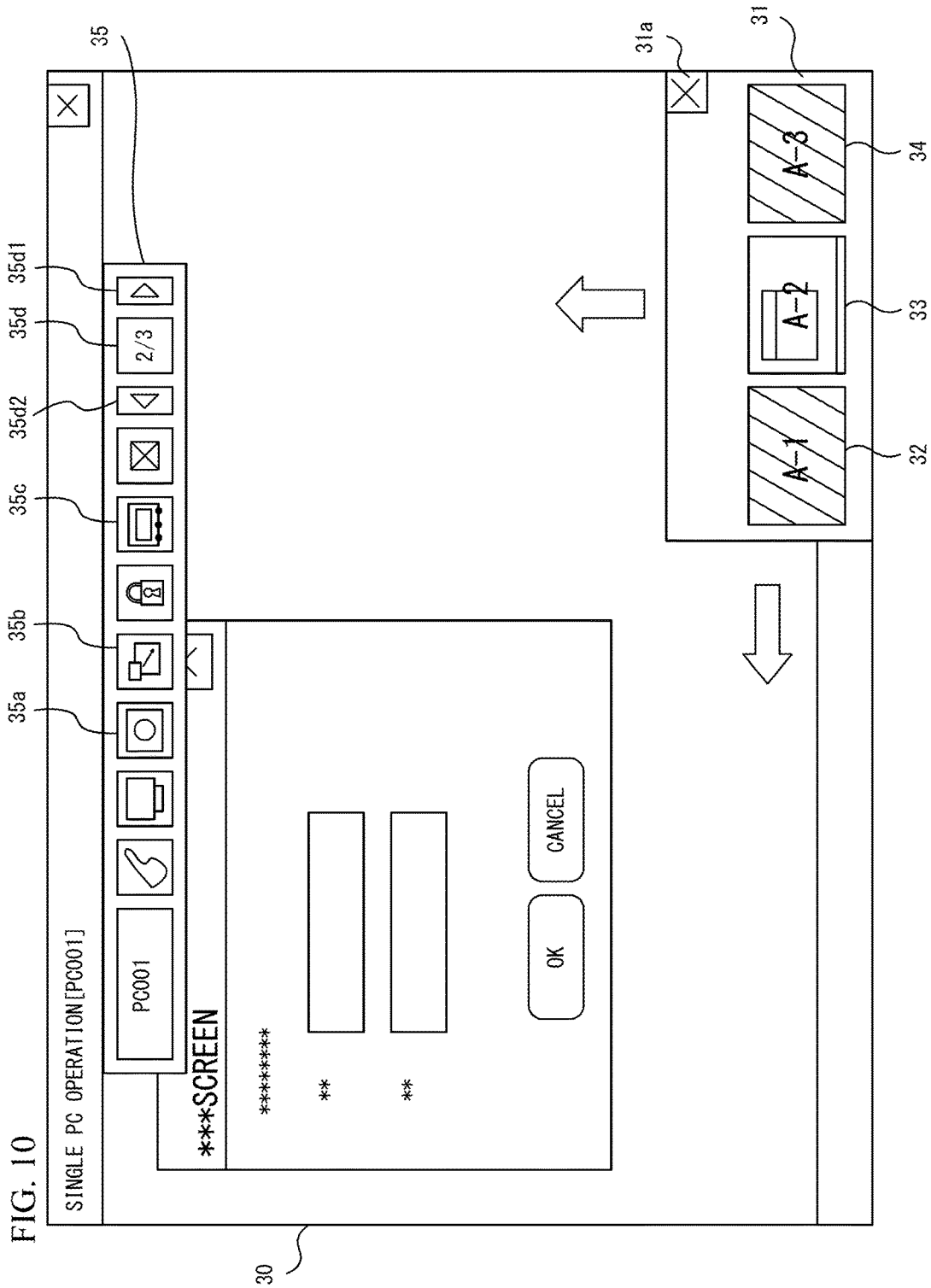
FIG. 10 illustrates a monitor window in accordance with the first embodiment.
Figure 11:
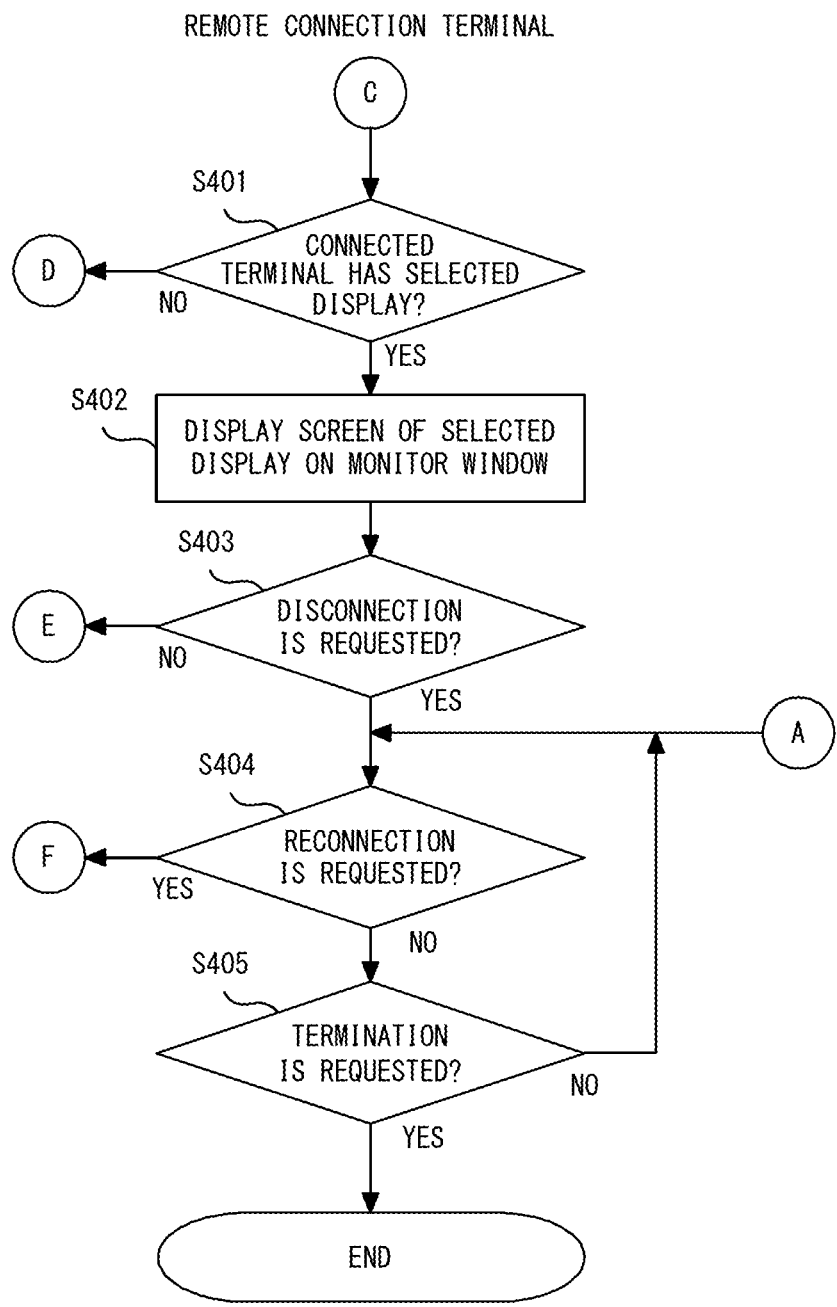
FIG. 11 is a flowchart (No. 3) of the exemplary operation of the remote connection terminal.

FIG. 7 is a flowchart (No. 1) of an exemplary operation of the remote connection terminal 100. FIG. 8 is a flowchart of an exemplary operation of the connected terminal 300. FIG. 9 is a flowchart (No. 2) of the exemplary operation of the remote connection terminal 100. FIG. 10 illustrates a monitor window 30 in accordance with the first embodiment. FIG. 11 is a flowchart (No. 3) of the exemplary operation of the remote connection terminal 100.

As illustrated in FIG. 7, the controller 753 determines whether an IP address is specified (step S101). More specifically, it is determined whether a specific image 25 (e.g., an OK button) is operated while the IP address is being specified in the entry field 21 on the remote operation screen illustrated in FIG. 6.

For example, when a computer name is input in the entry field 21, the controller 753 determines that an IP address has not been specified (step S101: NO), and inquires of the server device 200 for the DNS (step S102). This process allows the IP address according to the computer name to be identified. On the other hand, when an IP address is input in the entry field 21, the controller 753 determines that an IP address has been specified (step S101: YES), and skips the process of the step S102.

When an IP address is input or when the process of the step S102 is completed, the controller 753 requests connection to the connected terminal 300 through the communication unit 752 (step S103). In the first embodiment, since the computer name "PC001" is input (see FIG. 6), the controller 753 requests connection to the connected terminal 300 to which the computer name "PC001" is assigned.

On the other hand, as illustrated in FIG. 8, the controller 853 of the connected terminal 300 waits until the remote connection terminal 100 requests connection (step S201). When the remote connection terminal 100 requests connection (step S201: YES), the controller 853 responses to the connection request from the remote connection terminal 100 (step S202). This process connects the remote connection terminal 100 and the connected terminal 300. Upon completion of the processing of the step S202, the controller 853 waits until the remote connection terminal 100 requests the screen information (step S203: NO).

Referring back to FIG. 7, when the connected terminal 300 make a response (step S104: YES), the controller 753 of the remote connection terminal 100 determines whether a display is selected (step S105). When no display is selected (step S105: NO), the controller 753 selects a primary display as a default (step S106).

On the other hand, when a display is selected (step S105: YES), the controller 753 skips the process of the step S106. When a display is selected, or when the primary display is selected, the controller 753 requests the screen information to the connected terminal 300 (step S107). More specifically, the controller 753 requests the screen information about the selected display or the screen information about the primary display.

On the other hand, as illustrated in FIG. 8, when the remote connection terminal 100 requests the screen information (step S203: YES), the controller 853 obtains the screen information from the storage unit 851 (step S204). More specifically, the controller 853 obtains the screen information, the setting information, and the identification information from the storage unit 851. Upon completion of the processing of the step S204, the controller 853 transmits the screen information to the remote connection terminal 100 through the communication unit 852 (step S205). More specifically, the controller 853 transmits information that correlates the screen information, the setting information, and the identification information.

With reference to FIG. 9, when receiving the information transmitted from the connected terminal 300, the controller 753 of the remote connection terminal 100 determines whether the connected terminal 300 is of a multidisplay type based on the received information (step S301). For example, when the setting information received by the controller 753 includes the positional relation among the remote screens or when the controller 753 receives a plurality of sets of the identification information, the controller 753 determines that the connected terminal 300 is of a multidisplay type (step S301: YES). In contrast, when the setting information received by the controller 753 does not include the positional relation among the remote screens, or when the controller 753 receives one set of the identification information, the controller 753 determines that the connected terminal 300 is not of a multidisplay type (step S301: NO).

When the connected terminal 300 is of a multidisplay type, the controller 753 determines the presence or absence of a switching window (step S302). The switching window is a display region including selection displays for switching the remote screens displayed in the entire of or the most part of the monitor window described later as an operation part. More specifically, as illustrated in FIG. 10, the controller 753 determines whether a switching window 31 is present on the monitor window 30 overlapping with the own screen. When the switching window is not present (step S302: YES), the controller 753 generates the switching window including a plurality of selection displays (step S303), and displays the generated switching window (step S304). This process allows the switching window 31 including selection displays 32, 33, and 34 to be displayed on the monitor window 30 as illustrated in FIG. 10. In FIG. 10, the switching window 31 is illustrated at the right corner, but the switching window 31 can be moved from side to side and up and down in the region of the monitor window 30.

In addition to the switching window 31, an operation panel 35 is also displayed on the monitor window 30 as illustrated in FIG. 10. The operation panel 35 includes a plurality of icons executable to the remote screen displayed in the monitor window 30. For example, when an icon 35a representing a camera is operated, the still image (so-called snapshot) of the remote screen can be retained. For example, when an icon 35b representing enlargement is operated, the size of the monitor window 30 can be adopted to the size of the own screen. For example, when an icon 35c representing that the connection destination is a multidisplay is operated, the switching window 31 can be displayed or stopped being displayed. A number display part 35d displays the total number of displays in a denominator, and displays the display number of the display currently displayed in a numerator. When a button 35d1 is operated, the display subject to display moves forward, and when a button 35d2 is operated, the display subject to display moves backward.

On the other hand, at the process of the step S302 illustrated in FIG. 9, when determining that the switching window is present (step S302: NO), the controller 753 determines whether the switching window is closed (step S305). More specifically, the controller 753 determines whether a specific image 31a illustrated in FIG. 10 (for example, a close button) is operated. When determining that the switching window has not been closed (step S305: NO), the controller 753 updates the switching window (step S306). That is, when the switching window 31 is already present, the selection displays 32, 33, and 34 included in the switching window 31 are updated. In contrast, when determining that the switching window is closed (step S305: YES), the controller 753 skips the process of the step S306. In this case, the switching window 31 is eliminated from the monitor window 30.

When the connected terminal 300 is not of a multidisplay type at the process of the step S301 illustrated in FIG. 9, the controller 753 further determines whether the switching window is present (step S307). When the switching window is present (step S307: YES), the controller 753 closes the switching window (step S308). That is, since the connected terminal 300 is not of a multidisplay type, there is no chance to select a display. Thus, the switching window 31 is closed. In contrast, when determining that the switching window is not present (step S307: NO), the controller 753 skips the process of the step S308.

Upon completion of the processing of the step S304, S306, or S308, the controller 753 determines whether the connected terminal 300 has the selected display (step S401) as illustrated in FIG. 11. When the connected terminal 300 has the selected display (step S401: YES), the controller 753 displays the remote screen of the selected display 820 on the monitor window (step S402). This process causes the monitor window 30 to display the remote screen of the selected display 820 in the center part thereof as illustrated in FIG. 10. In FIG. 10, as an example, the remote screen of the center display 820 of the connected terminal 300 (see FIG. 1) is displayed in the center part of the monitor window 30. At this time, the identification information "A-2" may be temporarily (e.g., for a few seconds) displayed on the remote screen.

Additionally, at this time, the controller 753 displays the selection display 33, which is the reduced remote screen of the selected display 820, in the switching window 31 together with the identification information "A-2". On the other hand, the selection displays 32 and 34 with the identification information "A-1" and "A-3" displayed are displayed at the both sides of the selection display 33 with the identification information "A-2" displayed. Since the screen information of the unselected display 820 is not obtained, the controller 753 displays the selection displays 32 and 34 with the remote screens not displayed.

On the other hand, at the process of the step S401, when the connected terminal 300 does not have the selected display (step S401: NO), the process returns to the above step S106 (see FIG. 7). Thus, the controller 753 selects the primary display, and then executes the subsequent processes.

Upon completion of the processing of the step S402, the controller 753 determines whether disconnection is requested from the keyboard 710 (step S403). When disconnection is not requested (step S403: NO), the controller 753 returns to the process of the above step S105 (see FIG. 7). Thus, the controller 753 determines again whether a display is selected.

On the other hand, when disconnection is requested (step S403: YES), or when there is no response at the process of the above step S104 (see FIG. 7) (step S104: NO), the controller 753 determines whether reconnection is requested from the keyboard 710 (step S404). When reconnection is requested (step S404: YES), the controller 753 returns to the process of the above step S103 (see FIG. 7). Thus, the controller 753 requests again connection to the connected terminal 300.

On the other hand, when reconnection is not requested (step S404: NO), the controller 753 determines whether termination is requested from the keyboard 710 (step S405). When termination is not requested (step S404: NO), the controller 753 returns to the process of the step S404. Thus, the controller 753 determines again whether reconnection is requested. On the other hand, when termination is requested (step S404: YES), the controller 753 ends the process.

As described above, in the first embodiment, the remote connection terminal 100 includes the controller 753. The controller 753 receives a plurality of remote screens displayed on respective displays 820, a plurality of sets of the identification information for identifying the displays 820, and the setting information about the positional relation among the displays. Additionally, the controller 753 displays one of the received remote screens on the display 720 of the remote connection terminal 100, and displays the received plurality of sets of the identification information in the positional relation according to the received setting information. This configuration enables to display the identification information that enables to identify which display 820 of the displays 820 is displaying the remote screen. Therefore, the users can smoothly advance the discussion while checking the identification information of the remote screens they are discussing.

Second Embodiment

Figure 13:
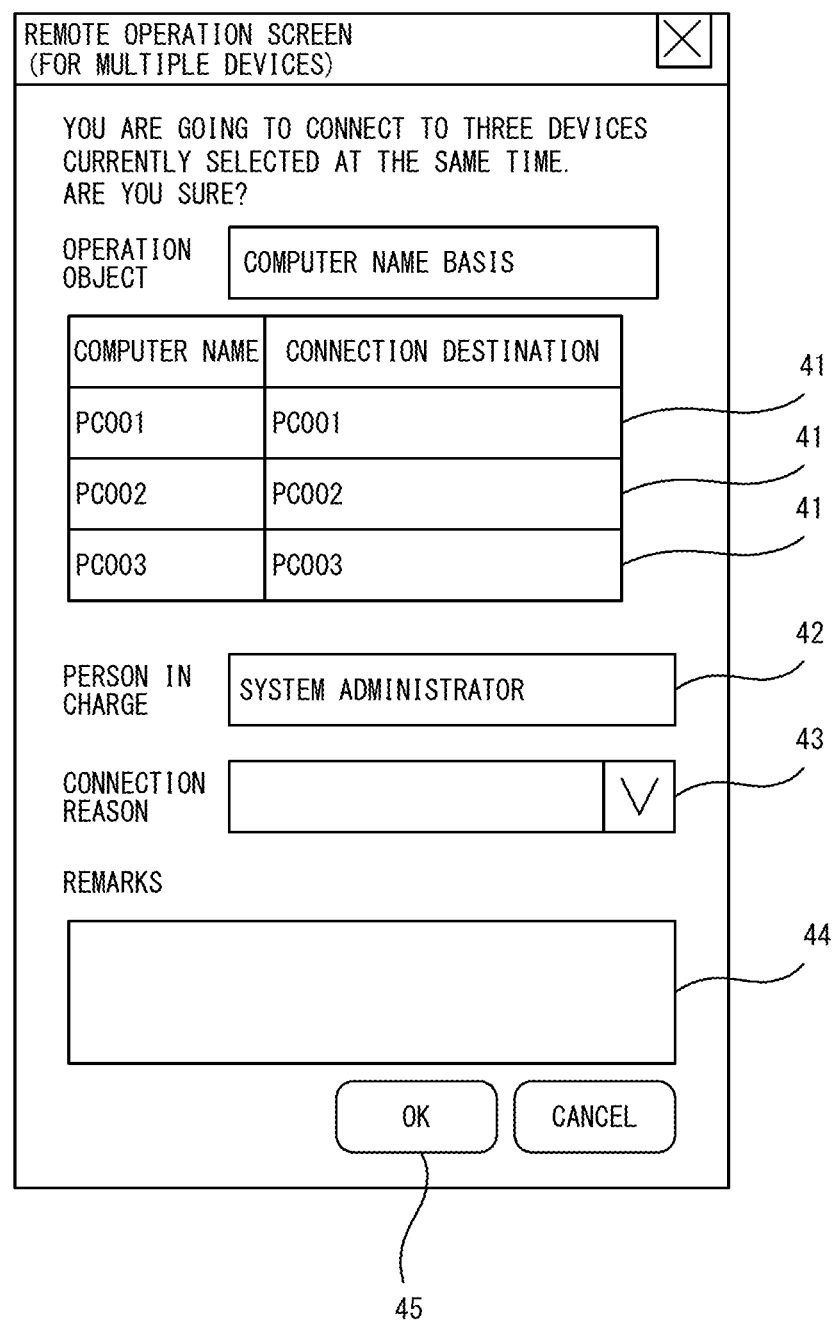
FIG. 13 illustrates the remote operation screen in accordance with the second embodiment.
Figure 14:
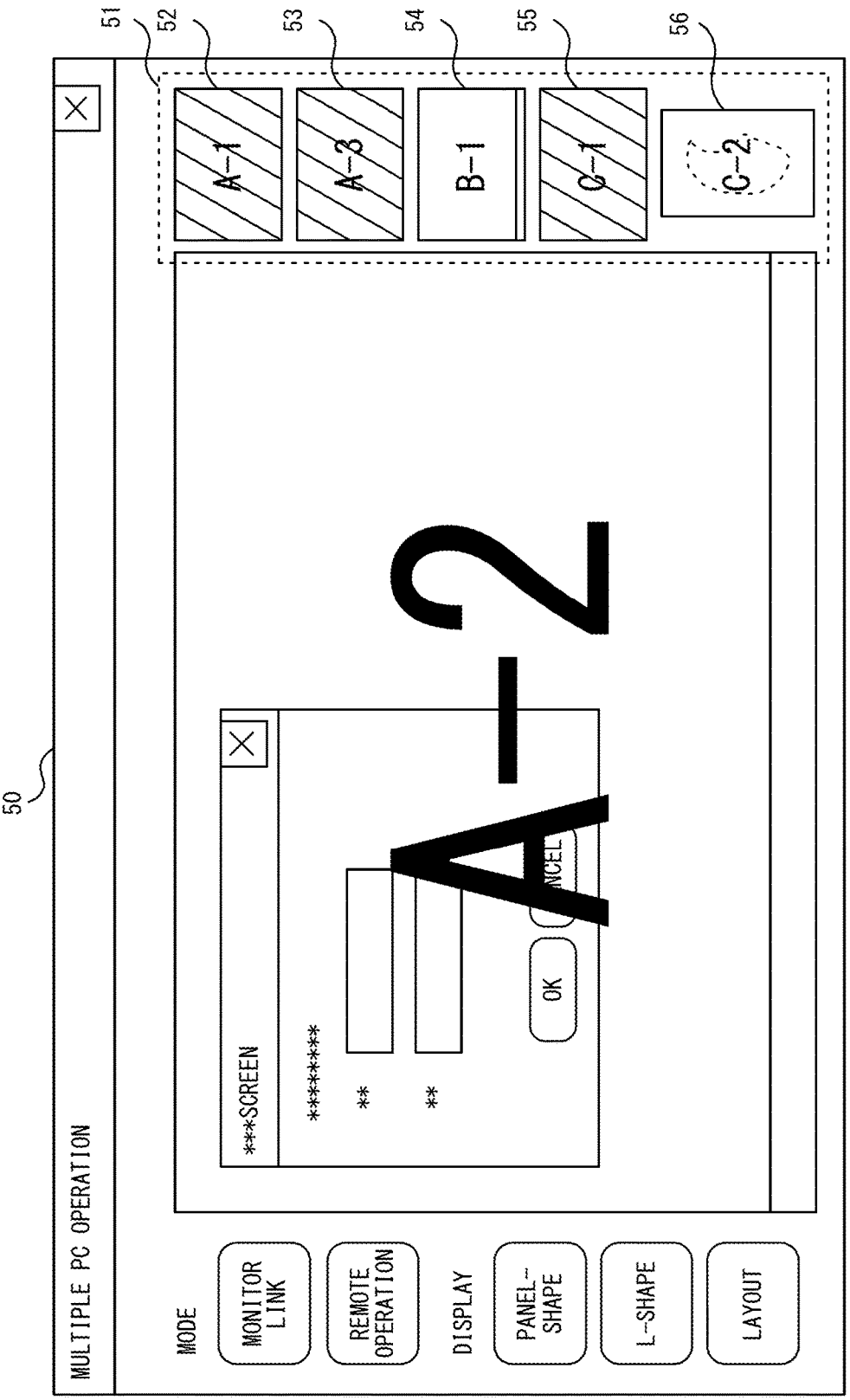
FIG. 14 illustrates the monitor window in accordance with the second embodiment.

The second embodiment will be described with reference to FIG. 12 through FIG. 14. FIG. 12 illustrates the device list screen in accordance with the second embodiment. FIG. 13 illustrates the remote operation screen in accordance with the second embodiment. FIG. 14 illustrates the monitor window in accordance with the second embodiment.

In the first embodiment, as described with reference to FIG. 4, when one specific item X1 is specified by the pointer Pt and the specific image 10 is then operated, the controller 753 receives the operation, expands the image 10, and displays a plurality of selection items on the display 720 as illustrated in FIG. 5.

On the other hand, in the second embodiment, as described with reference to FIG. 12, when specific items X1, X2, and X3 are specified by the pointer Pt and the specific image 10 is then operated, the controller 753 receives the operation, expands the image 10, and displays a plurality of selection items on the display 720 as in the first embodiment (see FIG. 5).

Furthermore, when the specific selection item 11 is operated by the pointer Pt (see FIG. 5), the controller 753 receives the operation and generates information that requests the remote operation screen for multiple devices. When the controller 753 generates the information that requests the remote operation screen for multiple devices, the communication unit 752 transmits the generated information to the server device 200.

When receiving the information that requests the remote operation screen for a plurality of displays, the information processing unit 220 of the server device 200 transmits the screen information of the remote operation screen for multiple devices to the remote connection terminal 100. This configuration causes the remote connection terminal 100 to display the remote operation screen for multiple devices as illustrated in FIG. 13. On the remote operation screen, displayed are entry fields 41 for inputting a connection method of a connection destination, an entry field 42 for inputting a person in charge who conducts a remote operation, a selection field 43 for selecting a connection reason, and an entry field 44 for inputting remarks. Through the remote operation screen for multiple devices, the administrator can specify the connected terminals 300, 310, and 320 that are subject to the remote connection. The computer names of the connected terminals 300, 310, and 320 or the IP addresses of the connected terminals 300, 310, and 320 may be input to the entry fields 41 as the connection method.

Furthermore, when a specific image 45 (e.g., an OK button) is operated while the computer names are being specified in the entry fields 41 on the remote operation screen for multiple devices, the controller 753 displays a monitor window 50 on the display 720 as illustrated in FIG. 14. The monitor window 50 includes a switching part 51, and the switching part 51 includes selection displays 52, 53, 54, 55, and 56.

The identification information "A-1", "A-3", "B-1", "C-1", and "C-3" are respectively superimposingly displayed on the selection displays 52, 53, 54, 55, and 56. FIG. 14 illustrates a case where the controller 753 obtained the screen information of each of the displays 820 to which the identification information "A-2", "B-1", and "C-2" was set, and did not obtain the screen information of each of the displays 820 to which the remaining identification information was set. When one of the selection displays 52, 53, 54, 55, and 56 is selected, the controller 753 enlarges the selected selection display 52, 53, 54, 55, or 56 and displays it in the center part of the monitor window 50, and temporarily (e.g., for a few seconds) displays its identification information at the center part. As described above, the second embodiment also enables to display information that enables to identify which display 820 of the displays 820 is displaying the remote screen.

Third Embodiment

Figure 15A:
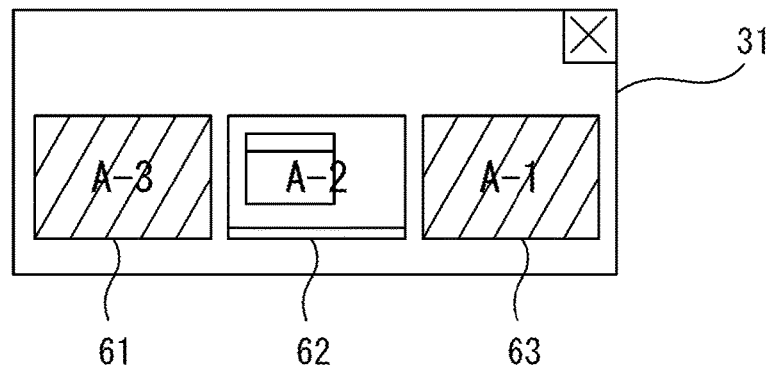
FIG. 15A through FIG. 15C are diagrams for describing an arrangement of selection displays displayed in a switching window.
Figure 15B:
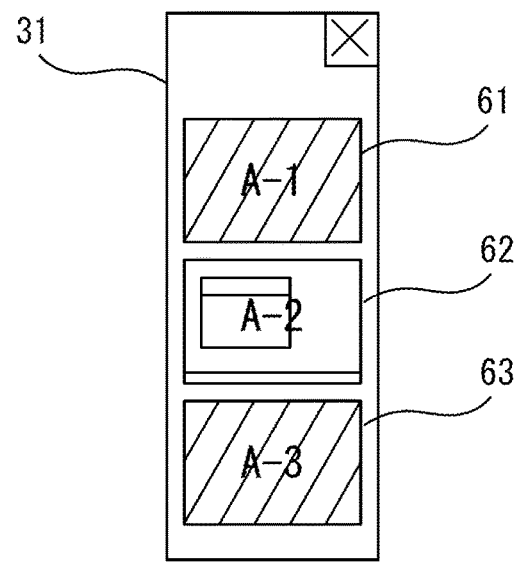
Figure 15C:
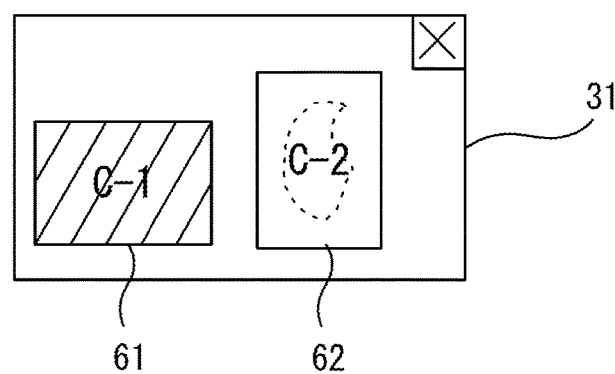

A third embodiment will be described with reference to FIG. 15A through FIG. 15C. FIG. 15A through FIG. 15C are diagrams for describing an exemplary arrangement of the selection displays displayed on the switching window 31. As illustrated in FIG. 15A through FIG. 15C, the controller 753 displays selection displays 61, 62, and 63 in various arrangement manners in the switching window 31 according to the setting information. For example, when the arrangement of the displays 820 is reversed right and left, the controller 753 may change the horizontal arrangement of the selection displays 61, 62, and 63 according to the setting information as illustrated in FIG. 15A. For example, when the displays 820 are vertically arranged, the controller 753 may arrange the selection displays 61, 62, and 63 vertically according to the setting information as illustrated in FIG. 15B. For example, when a horizontal display 820 and a vertical display 820 are mixed, the controller 753 may arrange the selection display 61 horizontally and the selection display 62 vertically according to the setting information as illustrated in FIG. 15C. That is the selection displays 61 and 62 may be arranged in different directions. As described above, the third embodiment also enables to display information that enables to identify which display of the displays is displaying the image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention. For example, the above first and second embodiments temporarily display the identification information, but may always display the identification information.

What is claimed is:

1. A non-transitory computer-readable storage medium storing a display control program that causes a computer to execute a process, the process comprising:

receiving, from an another device installed in a location different from an own device, any one set of image information among respective sets of image information displayed on respective displays of a plurality of displays of the another device, a plurality of sets of identification information for identifying the plurality of displays of the another device, and setting information about a positional relation among the plurality of displays of the another device; and displaying the received any one set of image information on a display of the own device, and displaying the received plurality of sets of identification information in the positional relation according to the received setting information on the display of the own device.

2. The non-transitory computer-readable storage medium according to claim 1, wherein the process further comprises displaying the image information with a size of the display of the own device, and displaying the plurality of sets of identification information in the positional relation according to the setting information in a display region having a size smaller than the size of the display of the own device.

3. The non-transitory computer-readable storage medium according to claim 2, wherein the display region is movable while being superimposingly displayed on the image information.

4. The non-transitory computer-readable storage medium according to claim 1, wherein the process further comprises displaying the plurality of sets of identification information on predetermined images that are arranged in the positional relation according to the setting information and arranged in directions according to directions of the plurality of displays.

5. The non-transitory computer-readable storage medium according to claim 1, wherein the own device includes the computer.

6. The non-transitory computer-readable storage medium according to claim 1, wherein
the own device includes the display that is coupled to one control device including the computer, and
the another device includes the plurality of displays that are coupled to one control device.

7. A non-transitory computer-readable storage medium storing a display control program that causes a computer to execute a process, the process comprising:
receiving, from an another device installed in a location different from an own device, any one set of image information among respective sets of image information displayed on respective displays of a plurality of displays of the another device and a plurality of sets of identification information for identifying the plurality of displays of the another device, the respective sets of image information being generated by a specific device, each of the plurality of sets of identification information being displayed on a corresponding one of the plurality of displays of the another device;
displaying a plurality of operation parts on a display of the own device based on the received plurality of sets of identification information on the display of the own device, the plurality of operation parts being correlated with the plurality of displays of the another device; and
when receiving selection of an operation part of the displayed plurality of operation parts, displaying image information displayed on a display of the another device corresponding to the selected operation part on the display of the own device by switching the received any one set of image information.

8. A non-transitory computer-readable storage medium storing a display control program that causes a computer to execute a process, the process comprising:
receiving, from an another device installed in a location different from an own device, any one set of image information among respective sets of image information displayed on respective displays of a plurality of displays of the another device and a plurality of sets of identification information for identifying the plurality of displays of the another device, the respective sets of image information being generated by a specific device, each of the plurality of sets of identification information being displayed on a corresponding one of the plurality of displays of the another device; and
displaying the received any one set of image information on a display of the own device, and displaying the received plurality of sets of identification information in a manner that enables to distinguish identification information of a display of the another device on which the received any one set of image information is displayed among the plurality of sets of identification information on the display of the own device.

9. A display control method implemented by a computer, the display control method comprising:
receiving, from an another device installed in a location different from an own device, any one set of image information among respective sets of image information displayed on respective displays of a plurality of displays of the another device, a plurality of sets of identification information for identifying the plurality of displays of the another device, and setting information about a positional relation among the plurality of displays of the another device; and
displaying the received any one set of image information on a display of the own device, and displaying the received plurality of sets of identification information in the positional relation according to the received setting information on the display of the own device.

10. A display control method implemented by a computer, the display control method comprising:
receiving, from an another device installed in a location different from an own device, any one set of image information among respective sets of image information displayed on respective displays of a plurality of displays of the another device and a plurality of sets of identification information for identifying the plurality of displays of the another device, the respective sets of image information being generated by a specific device, each of the plurality of sets of identification information being displayed on a corresponding one of the plurality of displays of the another device;
displaying a plurality of operation parts on a display of the own device based on the received plurality of sets of identification information on the display of the own device, the plurality of operation parts being correlated with the plurality of displays of the another device; and
when receiving selection of an operation part of the displayed plurality of operation parts, displaying image information displayed on a display of the another device corresponding to the selected operation part on the display of the own device by switching the received any one set of image information.

11. A display control method implemented by a computer, the display control method comprising:
receiving, from an another device installed in a location different from an own device, any one set of image information among respective sets of image information displayed on respective displays of a plurality of displays of the another device and a plurality of sets of identification information for identifying the plurality of displays of the another device, the respective sets of image information being generated by a specific device, each of the plurality of sets of identification information being displayed on a corresponding one of the plurality of displays of the another device; and
displaying the received any one set of image information on a display of the own device, and displaying the received plurality of sets of identification information in a manner that enables to distinguish identification information of a display of the another device on which the received any one set of image information is displayed among the plurality of sets of identification information on the display of the own device.

12. A display control device comprising:
a processor configured to:
receive, from an another device installed in a location different from an own device, any one set of image information among respective sets of image information displayed on respective displays of a plurality of displays of the another device, a plurality of sets of identification information for identifying the plurality of displays of the another device, and setting information about a positional relation among the plurality of displays of the another device; and display the received any one set of image information on a display of the own device, and display the received plurality of sets of identification information in the positional relation according to the received setting information on the display of the own device.

13. The display control device according to claim 12, wherein the processor is configured to display the image information with a size of the display of the own device, and display the plurality of sets of identification information in the positional relation according to the setting information in a display region having a size smaller than the size of the display of the own device.

14. The display control device according to claim 13, wherein the display region is movable while being superimposingly displayed on the image information.

15. The display control device according to claim 12, wherein the processor is configured to display the plurality of sets of identification information on predetermined images that are arranged in the positional relation according to the setting information and arranged in directions according to directions of the plurality of displays.

16. A display control device comprising:

a processor configured to:

receive, from an another device installed in a location different from an own device, any one set of image information among respective sets of image information displayed on respective displays of a plurality of displays of the another device and a plurality of sets of identification information for identifying the plurality of displays of the another device, the respective sets of image information being generated by a specific device, each of the plurality of sets of identification information being displayed on a corresponding one of the plurality of displays of the another device;

display a plurality of operation parts on a display of the own device based on the received plurality of sets of identification information on the display of the own device, the plurality of operation parts being correlated with the plurality of displays of the another device; and when receiving selection of an operation part of the displayed plurality of operation parts, display image information displayed on a display of the another device corresponding to the selected operation part on the display of the own device by switching the received any one set of image information.

17. A display control device comprising:

a processor configured to:

receive, from an another device installed in a location different from an own device, any one set of image information among respective sets of image information displayed on respective displays of a plurality of displays of the another device and a plurality of sets of identification information for identifying the plurality of displays of the another device, the respective sets of image information being generated by a specific device, each of the plurality of sets of identification information being displayed on a corresponding one of the plurality of displays of the another device; and display the received any one set of image information on a display of the own device, and display the received plurality of sets of identification information in a manner that enables to distinguish identification information of a display of the another device on which the received any one set of image information is displayed among the plurality of sets of identification information on the display of the own device.

* * * * *